United States Patent [19]

Kurachi

[11] Patent Number: 5,403,606
[45] Date of Patent: Apr. 4, 1995

[54] PROCESS OF MAKING ENRICHED ARTIFICIAL RICE

[75] Inventor: Hideo Kurachi, Nagoya, Japan

[73] Assignee: Japan Corn Starch Co., Ltd., Nagoya, Japan

[21] Appl. No.: 134,031

[22] Filed: Oct. 12, 1993

[51] Int. Cl.6 .............................. A21D 2/36
[52] U.S. Cl. ................... 426/446; 426/450; 426/451; 426/452; 426/455; 426/463; 426/464; 426/465
[58] Field of Search ........... 426/549, 550, 555, 557, 426/560, 74, 72, 650, 803, 446, 450, 451, 452, 455, 456, 463, 464, 465

[56] References Cited

U.S. PATENT DOCUMENTS

| | | | |
|---|---|---|---|
| 3,620,762 | 11/1971 | Yoshida et al. | 426/626 |
| 3,628,966 | 12/1971 | Katsuya et al. | 426/302 |
| 4,192,900 | 3/1980 | Cheng | 426/579 |
| 5,211,977 | 5/1993 | Hauser et al. | 426/557 |

FOREIGN PATENT DOCUMENTS 4-69267 10/1991 Japan.
4-13986 3/1992 Japan.

*Primary Examiner*—Helen Pratt
*Attorney, Agent, or Firm*—Reising, Ethington, Barnard, Perry & Milton

[57] ABSTRACT

A process of making an enriched artificial rice product comprising by dry weight 50% to 98% of at least one starch or starch derivative, 2% to 45% of at least one enriching material, and 0.1% to 10% of at least one gelling hydrocolloid whereby the enriched artificial rice product can be prepared with the cooking water being at least twice the volume of the rice.

11 Claims, No Drawings

PROCESS OF MAKING ENRICHED ARTIFICIAL RICE

TECHNICAL FIELD

This invention relates to the formation of enriched artificial rice granules.

BACKGROUND OF THE INVENTION

Artificial rice can be produced using a variety of methods from a variety of starch sources. An artificial rice allows the introduction of additional nutrients and flavorings into the granule that are not present naturally.

U.S. Pat. Nos. 3,620,762 and 3,628,966 provide a method for producing an enriched rice product. The method includes forming an enriched rice starch, heating the mixture so that it is partially gelatinized (semigelatinized) and taking this viscous product and forming it into granules resembling rice granules and coating each granule with a waterproof coating. This method is cumbersome, and the requirements of the semigelatinizing step and coating step increase the cost of production.

Japanese patent HEI 4-13986, assigned to the assignee of the present invention, discloses a method of forming shaped granules of starch from non-rice sources. The starch is isolated, mixed with water and kneaded and then formed into artificial rice granules using a rolling granulator. The artificial rice granules do not require a coating nor is a semigelatinizing step required. The artificial rice that is formed retains a rice-like texture and consistency upon cooking.

Japanese patent HEI 3-69267, also assigned to the assignee of the present invention, discloses a method of forming a decorated artificial rice in which color is introduced by combining the starch with extracts from vegetables, fruits, herbs, mushrooms, seafood and seaweed. The patent further discloses that these additives may make an enriched artificial rice by adding nutrients.

Both the HEI 4-13986 and HEI 3-69267 patents prepare the artificial rice so that it can be cooked using the Japanese cooking method of boiling in only 1.5 times the volume of water as rice. However, in the United States, the Indica strain of rice is preferred. The cooking method for the Indica strain of rice requires that the cooking water be at least twice the volume of the rice, which can be referred to as the American method. Therefore, any artificial rice introduced into the United States should conform to the cooking method that is most common in order to have consumer acceptance.

An artificial rice which contains 2% or more of vegetable matter and made by the above methods cannot be properly prepared using water at twice the volume of rice. The rice granules turn to a sticky gel and loose their rice-like texture or shape when cooked with the American method.

U.S. Pat. No. 4,129,900 discloses a method of preparing shaped granules of starch which includes water-soluble gelling hydrocolloids. The use disclosed for such granules is in puddings which are retorted or aseptically packaged. The method allows the formation of translucent pearls of gelatinized starch granules, i.e. tapioca-like, upon cooking. However, because of their formation and composition, the granules do not lend themselves to use in non-pudding applications. When cooked using the American method for rice preparation, the granules have a pasta-like texture. The high shear of the extrusion method used to form the granules destroys the starch micro-particles giving rise to a product with a gummy texture unlike that of native rice.

U.S. Pat. No. 5,211,977 discloses a method of preparing a starch-based mixture that includes a starch source, flavorings including vegetable powders, from 3% to 10% dried weight, an emulsifier and hydrocolloid which is used to form a pasta product. The pasta is formed using a pressure extrusion process. However, this starch-based 10 mixture cannot be used in a rolling granulator. If the granulator is maintained at an elevated temperature, i.e. above 60° C., the starch-based mixture will adhere to the granulator. If the granulator is maintained at a cooler temperature, i.e. below 60° C., the mixture is too hard to form granules.

SUMMARY OF THE INVENTION AND ADVANTAGES

According to the present invention, an enriched artificial rice product is made comprising, by dry weight, 50% to 98% of at least one starch or starch derivative; 2% to 45% of at least one enriching material; and 0.1% to 10% of at least one gelling hydrocolloid. The enriched artificial rice product can be prepared using cooking water that is at least twice the volume of the rice.

The present invention further includes the method of preparing such an enriched artificial rice product including the steps of mixing together 50% to 98% by dry weight of at least one starch or starch derivatives with 2% to 45% by dry weight of at least one enriching material and 0.1% to 10% by dry weight of at least one gelling hydrocolloid to form a mixture. Water is added to the mixture, while the mixture is being kneaded, such that the final water content is 25% to 55%. The mixture is then granulated into rice-like granules using a roll-type granulator. The granules are then steamed for 3 to 30 minutes at a temperature of 70° C. to 105° C. The final step is to dry the granules to a water content of less than 20%. The enriched artificial rice granules formed by this method can be prepared in cooking water that is at least twice the volume of the rice.

The present invention allows the preparation of an artificial rice granule containing vegetable or fruit material. The method allows the introduction of additional nutrients and flavorings into the granule that are not present naturally.

DETAILED DESCRIPTION OF THE PREFERRED EMBODIMENT

The present invention is an enriched artificial rice product that includes a starch component, enriching matter and a gelling hydrocolloid.

The starch can be isolated from corn, waxy maize, potatoes, tapioca, sago, arrowroot, rice, wheat, and other cereal grains. The starch may be in the form of flours or seminolas of hard wheat, durum wheat, soft wheat, corn or rice. Further, modified starch products such as esterified, etherified or crosslinked starch can be used. The starch component is 50% to 98%, by dry weight, of the mixture. The starch component can be a mixture of starch or starch derivatives. Preferably the starch content will be 25% or more in order to provide a more rice-like texture.

Vegetable material can be used for enriching the artificial rice product and can be isolated from carrots, spinach, tomatoes, onions and beets. Bell peppers, both red and green, can also be used, as can radishes and celery. Members of the cabbage family and the squash family, such as pumpkin, are also suitable sources of vegetable matter to be used. Additionally, edible seaweeds and fruits such as oranges, pineapples, apples, cherries, berries and the like may be used to enrich the rice.

The enriching material can be freshly minced material or pastes, juices and dried flakes or chips. Additionally, powdered or freeze-dried enriching material can be used. The mixture will contain from 2% to 45% of at least one of the enriching materials.

The gelling hydrocolloid can be either egg white, curdlan, gellan gum, sodium alginate, sodium pectate, methylcellulose, ethylcellulose, hydroxypropylcellulose, methylhydroxypropylcellulose, methylethylcellulose, carrageenan, furcellaran, agar, gelatin, xanthan gum, locust bean gum, or guar gum. In a preferred embodiment, either egg white (3–7%), curdlan (0.5–3%) or gellan gum (0.1–2%) or a mixture thereof is used.

The amount of hydrocolloids the mixture will contain is from 0.1% to 10% of at least one of the gelling hydrocolloids. If less than 0.1% is used, there is no effect on the texture. If more than 10% is used, the artificial rice granules are too hard.

The present invention also allows the addition of flavorings, fiber, vitamins, carotenoids and proteins to the starch-based mixture. The starch-based mixture can include up to 10% protein. The source of protein can be gluten or protein extracted from soy beans. The preferred source of gluten is either active wheat gluten or corn gluten.

The starch-based mixture can include from 0.1% to 5% of at least one fiber supplement. In a preferred embodiment, microfibrilated cellulose and corn fiber are used. Also, apple fiber, wheat bran or rice bran can be used.

The starch-based mixture can include from 0.01% to 5% of at least one mineral supplement. In a preferred embodiment, calcium carbonate and ferric orthophosphate are used.

The starch-based mixture can include from 0.0001% to 2% of at least one vitamin supplement such as vitamin $B_1$, $B_2$, $B_6$, $B_{12}$, A, D, E and niacin or at least one carotene, such as $\beta$-carotene.

The present invention also allows for the addition of up to 5% of at least one flavoring agent. There are many flavoring agents available in the form of herbs, spices and extracts that could be incorporated depending on the end use of the artificial rice product. Some of the suitable flavoring agents are salt, soya sauce, ginger, sugar, pepper and curry powder.

In the method of preparing the enriched artificial rice product, first a mixture is prepared by mixing together 50% to 98% by dry weight of at least one starch or starch derivative with 2% to 45% by dry weight of at least one vegetable derived material and 0.1% to 10% by dry weight of at least one gelling hydrocolloid. Additional ingredients such as flavorings, fiber, vitamins, carotenoids and proteins, at appropriate concentrations, can also be added at this step as detailed hereinabove.

The next step requires the forming of a dough-like material by adding water to the mixture, up to a water content of 25% to 55%. As the water is being added, the mixture is being kneaded, forming a semigelatinized mixture. The kneading can be done either at 30°–80° C. for 10–60 minutes with a batch type kneader and twin roll compression or at 60°–95° C. for 2–30 minutes with a continuous screw kneader. At this step, the starch is semigelatinized (partially gelatinized, gelatinization ratio is 40–80%).

The kneaded starch-based mixture is then formed into rice-like granules using a roll-type granulator. In the preferred embodiment, a twin-roll granulator is used as described in Japanese patent HEI 4-13986, incorporated herein by reference.

The method then requires steaming the granules for 3 to 30 minutes at a temperature of 70° C. to 105° C., and then drying the granules to a water content of less than 20%.

The above method forms an artificial rice granule in which the starch microgranules are not destroyed, but only partially gelatinized (semigelatinized) thereby retaining the particle structure in the processed product to give, if cooked, the same texture as cooked rice. The texture of cooked native rice differs from pasta in that it is not gummy, softer, but with a brittle feel to the teeth, as best shown in Examples 4 and 5 hereinbelow.

The following examples illustrate the application of the present invention:

EXAMPLE 1

A starch-based mixture containing the following ingredients was prepared according to the present invention:

| | |
|---|---|
| 65 kg | corn starch |
| 25 kg | hard wheat flour |
| 9 kg | dried carrot powder |
| 1 kg | guar gum. |

The starch-based mixture was then kneaded in a kneader with 38 kg of water.

The kneaded starch-based mixture was then formed into a sheet and passed through a twin-roll type granulator. The rollers have hollows shaped as rice granules formed on the surface so that the sheet is granulated as it passes through. During the granulation, the surface temperature is kept at or below 30° C. by passing of cooling water through the inside of the rollers.

The rice-like granules were steamed for 10 minutes at 100° C. and dried in a hot air dryer for 30 minutes at 105° C. The resulting enriched artificial rice product had a water content of 10%.

Cooking Results:

100 g of the artificial rice were cooked in 300 g of boiling water for 15 minutes and dewatered with a sieve. The cooked enriched artificial rice maintained its rice granule-like shape and had a non-sticky texture.

EXAMPLE 2

A starch-based mixture containing the following ingredients was prepared according to the present invention:

| | |
|---|---|
| 85 kg | corn starch |
| 5 kg | hydroxypropylated tapioca starch |
| 5 kg | dried spinach powder |
| 2 kg | guar gum |
| 2 kg | microfibrilated cellulose powder |
| 1 kg | calcium carbonate |
| 0.001 kg | thiamin mononitrate |

The starch-based mixture was then kneaded in a kneader with 40 kg of water.

The kneaded starch-based mixture was then granulated as in Example 1.

The rice-like granules were steamed for 5 minutes at 100° C. and dried in a hot air dryer for 60 minutes at 95° C. The resulting enriched artificial rice product had a water content of 11%.

Cooking Results:

A mixture of 100 g of the artificial rice and 100 g of Indica rice were cooked in 1000 g of boiling water for 15 minutes and dewatered with a sieve. The mixture of cooked enriched artificial rice and native rice maintained its rice granule-like shape and had a non-sticky texture.

EXAMPLE 3

A starch-based mixture containing the following ingredients was prepared according to the present invention:

| | |
|---|---|
| 30 kg | corn starch |
| 55 kg | hard wheat flour |
| 7 kg | dried pumpkin powder |
| 1 kg | guar gum |
| 1 kg | methylcellulose |
| 5 kg | microfibrilated cellulose powder |
| 1 kg | calcium carbonate |
| 0.01 kg | riboflavin |

The starch-based mixture was then kneaded in a kneader with 35 kg of water.

The kneaded starch-based mixture was then granulated as in Example 1.

The rice-like granules were steamed for 5 minutes at 100° C. and dried in a hot air dryer for 120 minutes at 85° C. The resulting enriched artificial rice product had a water content of 12%.

Cooking Results:

A mixture of 100 g of the artificial rice and 100 g of Indica rice were cooked in 1000 g of boiling water for 15 minutes and dewatered with a sieve. The mixture of cooked enriched artificial rice and native rice maintained its rice granule-like shape and had a non-sticky texture. The boiled rice mixture was then lightly fried in butter and other flavorings. The mixture of fried enriched artificial rice and native rice maintained its rice granule-like shape and had a non-sticky texture.

EXAMPLE 4

A starch-based mixture containing the following ingredients was prepared according to the present invention:

| | |
|---|---|
| 60 kg | corn starch |
| 25 kg | hard wheat flour |
| 8 kg | dried carrot powder |
| 5 kg | corn fiber |
| 2 kg | curdlan |

The starch-based mixture was then mixed with 45 kg of water and kneaded with a twin screw-type continuous kneader (ISHIKAWA-TOKI Co., Ltd.) to form a sheet (6 mm thickness) for 7 minutes retention time at 75° C. The sheet had a gelatinization ratio of 55%.

The sheet was then granulated with a roll-type granulator. The rice-like granules were steamed for 5 minutes at 100° C. and dried in a hot air dryer for 100 minutes at 85° C. The resulting enriched artificial rice product had a water content of 11%.

Cooking results:

100 g of the artificial rice and 200 g of water were brought to a boil and heated about 15 minutes with lower heat until all the water was absorbed. The cooked enriched artificial rice maintained its rice granule-like shape and had a non-sticky texture and had a rice-like brittleness to the teeth.

EXAMPLE 5

A starch-based mixture containing the following ingredients was prepared:

| | |
|---|---|
| 60 kg | corn starch |
| 25 kg | hard wheat flour |
| 8 kg | dried carrot powder |
| 5 kg | corn fiber |
| 2 kg | curdlan |

The starch-based mixture was then mixed with 45 kg of water and extruded through a 1 mm×3 mm diamond die and cut to granulate into rice-like granule. The rice-like granules were dried in a hot air dryer for 10 minutes at 105° C. The resulting enriched artificial rice product had a water content of 10%.

Cooking results:

100 g of the artificial rice and 200 g of water were brought to boil, and heated about 15 minutes with lower heat until all the water was absorbed. The cooked enriched artificial rice maintained its rice granule-like shape, but its texture was gummy and not as brittle to the teeth as cooked native rice. Its texture was similar to cooked pasta.

The invention has been described in an illustrative manner. It is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method of preparing an enriched artificial rice product comprising the steps of
   mixing together 50% to 98% by dry weight of at least one starch or starch derivatives with 2% to 45% by dry weight of at least one enriching material and 0.1% to 10% by dry weight of at least one gelling hydrocolloid to form a mixture;
   adding water to the mixture, while kneading the mixture, to have a water content of 25% to 55%;
   granulating the mixture into rice-like granules with a roll-type granulator;
   steaming the granules for 3 to 30 minutes at a temperature of 70° C. to 105° C., and
   drying to a water content of less than 20% whereby the enriched artificial rice product so formed can be prepared using at least twice the volume of cooking water as rice.

2. The method of claim 1 further characterized by adding to the mixture 0.1% to 5% of at least one fiber supplement selected from the group consisting of microfibrilated cellulose, corn fiber, apple fiber, wheat bran and rice bran.

3. The method of claim 1 further characterized by adding to the mixture 0.01% to 5% of at least one mineral supplement selected from the group consisting of calcium carbonate, ferric orthophosphate.

4. The method of claim 1 further characterized by adding to the mixture 0.0001% to 2% of at least one vitamin supplement or carotene.

5. The method of claim 1 further characterized by adding to the mixture up to 5% of at least one flavoring agent.

6. The method of claim 5 further characterized by selecting the flavoring agent from the group consisting of salt, soya sauce, ginger, sugar, pepper and curry powder.

7. The method of claim 1 further characterized by adding to the mixture up to 10% protein selected from the group consisting of gluten and soya protein.

8. The method of claim 1 further characterized by selecting the starch or starch derivatives from the group consisting of corn, waxy maize, potatoes, tapioca, sago, arrowroot, rice, wheat, other cereals and modified derivatives.

9. The method of claim 1 further characterized by selecting the enriching material from the group consisting of fresh minced material, pastes, juices, dried chips, freeze-dried and powdered prepared materials.

10. The method of claim 9 further defined by selecting the prepared enriching material from the group consisting of carrot, spinach, tomato, bell pepper, onion, beets, radish, celery, cabbage family, pumpkin, edible seaweeds, apples, oranges, pineapples and berries.

11. The method of claim 1 further characterized by selecting the gelling hydrocolloid from the group consisting of egg white, curdlan, gellan gum, sodium alginate, sodium pectate, methylcellulose, ethylcellulose, hydroxypropylcellulose, methylhydroxypropylcellulose, methylethylcellulose, carrageenan, furcellaran, agar, gelatin, xanthan gum, locust bean gum, and guar gum.

* * * * *